United States Patent [19]

Hogan

[11] 3,936,093
[45] Feb. 3, 1976

[54] STOWABLE, PULL-DOWN FOOTREST FOR A VEHICLE SEAT

[75] Inventor: Gerard T. Hogan, Southington, Conn.

[73] Assignee: Universal Oil Products Company, Des Plaines, Ill.

[22] Filed: Nov. 26, 1974

[21] Appl. No.: 527,480

[52] U.S. Cl. .................. 297/425; 297/430; 297/435
[51] Int. Cl.² ............................................ A47C 7/50
[58] Field of Search ............ 297/425, 430, 431, 432, 297/433, 435

[56] References Cited
UNITED STATES PATENTS

| | | |
|---|---|---|
| 2,481,970 | 9/1949 | Bell .................................. 297/425 |
| 2,602,490 | 7/1952 | Earl .................................. 297/425 |

*Primary Examiner*—James C. Mitchell
*Attorney, Agent, or Firm*—James R. Hoatson, Jr.; William H. Page II; Philip T. Liggett

[57] ABSTRACT

A footrest plate member is attached to two laterally spaced apart telescoping tube members that are pivotally attached to the upper underside portion of seat unit framing such that the lowered, pulled-out location of the footrest plate can be adjusted to suit a passenger in a next rearward seating unit. Push-button operated latching means is provided at the rear of a seating unit and is designed and arranged to provide for the stowing and releasing of the footrest assembly by a person located to the rear of the supporting and stowing seating unit.

3 Claims, 5 Drawing Figures

U.S. Patent  February 3, 1976  3,936,093
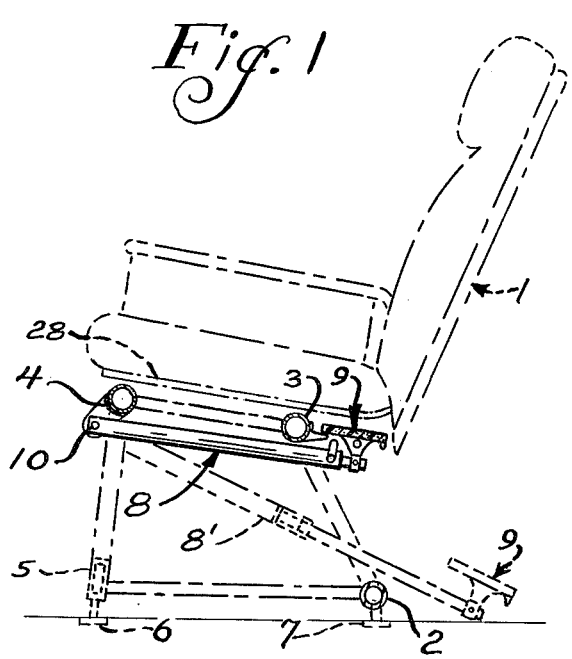
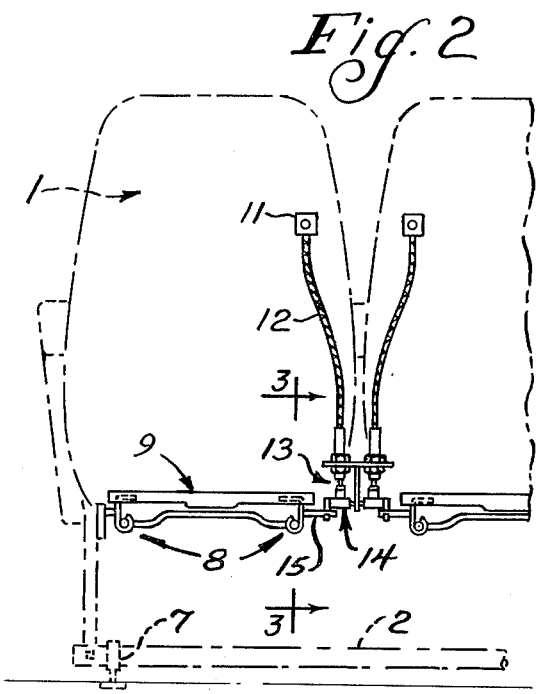
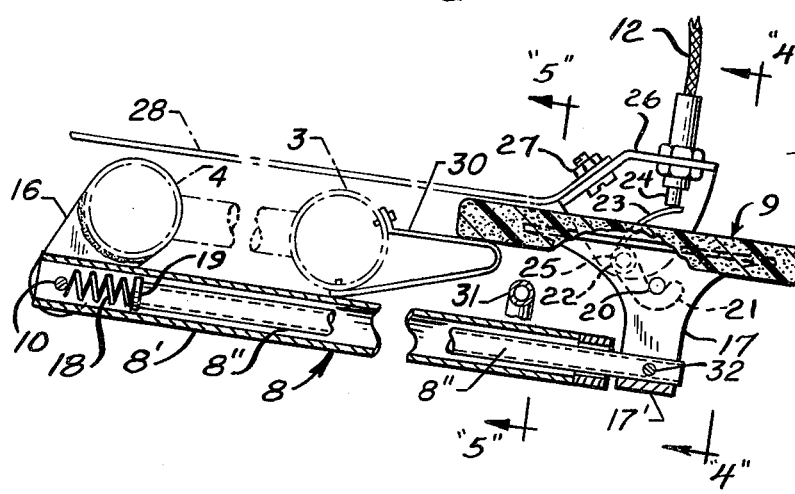
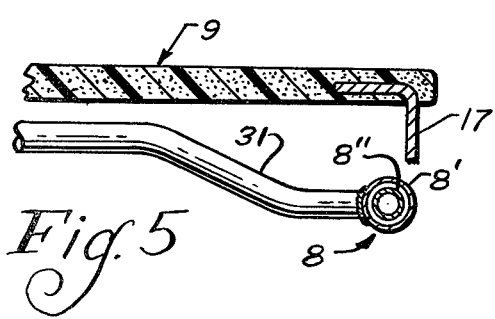
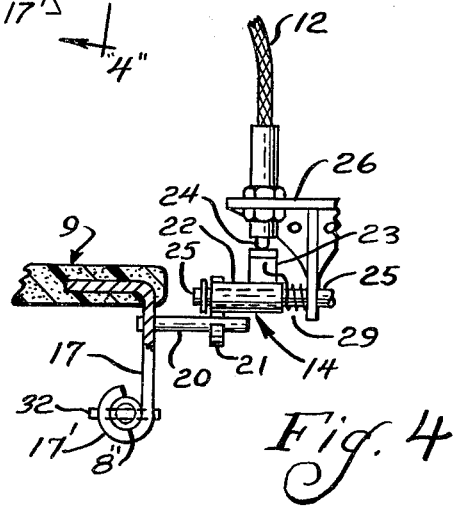

STOWABLE, PULL-DOWN FOOTREST FOR A VEHICLE SEAT

The present invention is directed to a special footrest assembly which is readily stowable under the seat framing of a vehicle seat and which can also be pulled out to a location that will be the most comfortable for a passenger in a next rearward seating unit.

In order to provide fore and aft adjustability, the present improved form of assembly has the footrest plate member connective to the rearward end portions of two spaced apart telescoping tube support members that have their frontal ends pivotally connected to the seat framing such that the footrest portion may be lowered and pulled out to any desired distance to suit the passenger who will be using the footrest. The pivot connection for the ends of the support tubes also permits the assembly to be readily swung upwardly to an out-of-the-way stowed position.

It is realized that there are many forms and types of footrests that are in use with passenger vehicle seating units. It is further known and realized that various footrest constructions provide for lifting or tipping a footrest member such that it will be off the floor and, at least to some degree, out of the way of the extended foot room for a passenger seated to the rear of the seating unit which is supporting the particular footrest member. However, most footrest units do not provide for fore and aft adjustment to accommodate different leg lengths for the persons to be using the footrest. Also, most assemblies are not made liftable and stowable under the seating section to the same degree as made possible by the present improved construction and arrangement.

In connection with airplane seating, it has been the general custom to provide no footrest means whatever, other than perhaps to have a rear transverse beam located close to the floor of the plane, with the beam being used primarily to attach the seating units to the floor tracks built into the floor of the aircraft. Generally, footrest means have been looked upon as adding extra weight to each seating unit, as well as taking up room under a seat so as to preclude the storage of luggage under the seats. However, with the present design and stowage arrangement, it is possible to lift and stow the footrest assembly well above the floor such that there is no blockage of floor space for long-legged passengers nor little, if any, interference with baggage stowage under the seating units.

In one aspect, it may be considered a principal object of the present invention to provide a lightweight form of adjustable and liftable footrest assembly which can be stowed out of the way under the seating portion of a vehicle seat so as to provide an arrangement of particular advantage for aircraft seating.

It is another object of the invention to use lightweight telescoping and front pivoting support tubes such that the footrest plate can be readily adjusted along the floor to the most desirable and comfortable location for the passenger using the footrest. Also, with the present footrest being supported from the vehicle floor when it is pulled out and in use, there are no undesired bending forces and jarring that will carry through into the supporting seating unit, such as can happen with cantilevered types of footrest units.

As still another object of the invention, there is provision to have the latching and unlatching means located on or adjacent the back of a seating unit such that the lowering and pulling out of a footrest, as well as the stowage thereof, can be easily carried out by the passenger to the rear of a seat which has the attached footrest.

In a broad embodiment, the invention covers a stowable, pulldown footrest assembly that is adapted to be connected to and stowed under the seat framing of a vehicle seating unit, which comprises in combination: (a) a pair of telescoping-tube footrest support members that are spaced apart laterally and each have their forward end portions pivotally connected to the upper front part of the framing below the seating level of said seating unit; (b) a footrest plate member connecting across the rear portions of said telescoping-tube support members, such that after said footrest plate member is lowered from a stowed position along with the tube support member there can be the extension of said telescoping tube members along and above the vehicle floor to reach a desired pulled-out, footrest location for the accommodation of a passenger seated in a next rearward seating unit; (c) a movable latching member attached to the seat framing and a latch engagement member provided as a part of the rearward end portion of the footrest assembly are in a connective association with one another such that said footrest assembly may be retained in a stowed location and alternatively released for use responsive to the movement of said latching member; and (d) means to move said latching member being connected to the rear of said vehicle seating unit.

Preferably, the telescoping-form of support tubes will be of lightweight aluminum tubing or of lightweight plastic tubing in order to minimize the weight of the entire assembly. Also the footrest plate member should be of lightweight material such as of thin cast aluminum or of lightweight rigid foam material. The latter may be of advantage in that a self-skinning surface may be provided on the foam in a desired pattern and preclude the necessity of any other covering material.

A latching arrangement which will hold the footrest assembly in an elevated, stowed position will preferably be operated from the back of the seating unit which is holding the particular footrest assembly. For example, a push-button extended cable arrangement can be used to operate a movable pin member or rod which, in turn, can move a latch arm to effect the unseating or unlatching of the rearward end portion of the footrest assembly such that the footrest section can pivot downwardly and be pulled down to a desired location. Various types of push-button means and remote control cable means, spring wire means, or hydraulic-operated means, may be utilized to effect the necessary movement of a spring biased latching member and it is not intended to limit the present invention to any one type of remote control operating means. There may also be provided a compression spring within the far end, i.e. or pivot end portion, of the telescoping tube arrangement such that there may be a spring biased initial extension of the concentric telescoping tube members and a resulting mechanical assist in unseating the footrest assembly from its stowed position.

Reference to the accompanying drawing and the following description thereof will serve to illustrate one embodiment of the improved form of footrest assembly, as well as show how the assembly may be stowed and released from under a vehicle passenger seating arrangement.

FIG. 1 of the drawing is a front-to-rear sectional elevational view indicating how the pivoted footrest assembly may be stowed and released from below the seating level of a vehicular seating unit.

FIG. 2 of the drawing illustrates in a diagrammatic rear view manner how the footrest assembly may be stowed under the seating portion of a vehicular seating unit and be held in such position, as well as released by push-button means in the rear of a seating unit so as to permit use by an occupant which will be seated to the rear of such unit.

FIG. 3 of the drawing is a diagrammatic and enlarged sectional elevational view showing the telescoping tubular support arrangement as well as a side view of a pivoting, hook-form of latching member to be used for holding the footrest assembly in an upward stowed position.

FIG. 4 of the drawing, as indicated by the line 4—4 in FIG. 3, provides a partial rear elevational view of a pivoting, spring biased, latching member as well as show a portion of remotely controlled push-button means to effect the movement of the pivoting latching member.

FIG. 5 of the drawing is a partial sectional view through the footrest plate portion, as indicated by the line 5—5 in FIG. 3.

Referring now particularly to FIGS. 1 and 2 of the drawing, there is illustrated diagrammatically (in dashed lines) a seating unit 1 such as may be utilized in a passenger carrying vehicle. It is, of course, not intended to limit the present footrest construction and arrangement for use with any one type of seat or support framing; however, the particular seating unit illustrated is indicated as having lower seat support framing which will include a rear transverse tubular beam member 2, an upper rear transverse tubular-form beam member 3, an upper front transverse member 4 and a lower transverse front stretcher beam 5. Both the front and rear transverse beams, as used in connection with airplane seating arrangements, will typically have adjustably positioned connecting pin members 6 and 7 which in turn can be utilized to attach a seating unit to track means (not shown) that is embedded in the floor of the aircraft. As best shown in FIG. 2, each footrest assembly will have a pair of spaced apart telescoping tube members 8 which will be utilized to support a rearward transverse footrest plate member 9. The latter, as shown in FIG. 1, will be attached to the rearward end portions of merely one of the telescoping tube members in each set of such members such that after the footrest member 9 is lowered from the upper stowed position there can be an extension of the telescoping tube support members and the footrest member 9 brought to any desired location along the floor of the vehicle (as shown by the dashed line location for the tubular members 8 as well as for footrest plate 9).

The forward end portions of each of the telescoping tube members 8 will be pivotally connected at 10 to the upper portion of the seat support framing but below the seating level, such that the tubular members as well as the footrest plate 9 can swing through an arc about connection points 10 when being placed in the upper stowed position or, alternatively, released and permitted to be lowered to the floor level. Preferably, the connections for the pivot points 10 will be maintained as high as possible so as to provide as much luggage storage space as possible, as well as foot room, when the footrest assembly is lifted and latched into the stowed position.

FIG. 2 of the drawing illustrates diagrammatically the use of a push-button 11 in an upper portion of the back of a seating unit 1 and extended tube or cable means 12 connecting to a spring biased movable pin means at 13 which can contact latching means 14 mounted on a rearward portion of the seating unit 1. There is also indicated an extended side pin or rod means 15 from a portion of the footrest plate 9, or its attachment means, such that there may be a fixed pin or latching member to be used in cooperation with the movable latching means 14. One illustrative arrangement is better shown and described in connection with the hereinafter set forth descriptions relating to FIGS. 3 and 4 of the drawing.

Referring now particularly to FIGS. 3 and 4, there is shown the telescoping tubular member 8 as having an outer tubular member 8' that is pin connected at 10 to a support plate 16, which in turn is illustrated as being connective with transverse front tube member 4 so as to provide a desired elevated, frontal pivot point for the entire footrest assembly. There is also indicated the use of an internal tubular member 8" which has its rearward end portion pin connected to bracket means 17 in turn connecting to footrest plate member 9. Each tube member 8" is free to slide back and forth within the outer tubular member 8' for each of the pair of telescoping tube support members 8 such that there can be the desired fore and aft adjustment for the positioning of the footrest member 9 to suit a passenger, as well as the inward telescoping of the tubular members to permit the stowage of the entire assembly under the seating level of a particular seating unit. The present embodiment also illustrates the use of a compression spring 18 internally between the attachment pin means 10 and an inner end pad member 19 on tube 8" such that when the tubes are fully collapsed and footrest member 9 is in the upper stowed position there is a slight compressive action on spring 18. This spring biasing in turn provides for a slight initial extension of telescoping tubing members as the latching means becomes disengaged for lowering the footrest assembly from a stowed position.

In connection with the illustrated latching means for the footrest assembly, there is shown a fixed pin member 20, extending from the side portion of connecting bracket 17, which is adapted for engagement with a pivoting latching hook-like member 21 of a latching unit 14. The latter, in turn, also has a tubular member 22 having an arm member 23 adapted to be moved by push rod means 24. The hollow tubular section 22 is illustrated as being mounted over a rod or shaft member 25 which extends from a fixed vertical bracket plate 26 which can be suitably attached to a portion of the seating unit framing. As best shown in FIG. 3, a shelf-like bracket 26 is bolted at 27 to a rear portion of a seat pan 28 which is typically provided as the underlying support for the bottom seat-cushion of a vehicle seat. As best shown in FIG. 4, the tubular member 22 together with the extension arm 23 will be spring biased by contact with a spring means 29 positioned around an inner portion of support rod 25 such that the hook portion 21 of latching unit 14 will, in turn, be biased to move in a "closed" position where there can be an automatic engagement with the pin means 20 from the footrest portion 9 as the latter is lifted upwardly and around the outer end portion of the hook-form latch member 21. The movable pin or rod portion 24, which is mounted in a position to move the latch arm 23, passes through and is fixedly connected to a horizontal portion of the bracket 26, as shown in both FIGS. 3 and 4, and typically will have extended wire or cable in a tube means 12 to permit operation from a push-button means, such as illustrated diagrammatically in FIG. 2. Also, the movable pin or rod means 24 will typically be spring biased to hold it in an upward, non-extended position such that when a passenger desires to make use of the footrest member there can be a pushing of the button 11 and the movement of rod member 24 to push lever arm 23 downwardly and cause latch hook member 21 to unseat itself around the extended arm member 20 from the footrest assembly and thus let the latter down for passenger usage.

When it is desired to stow the assembly, the inner telescoping tube 8" will be pushed forwardly within outer tubular member 8' and the entire assembly lifted upward under the stowing seat until there is contact with the latching member 21 and then a further lifting and pushing inward will provide that the holding member 20 will pass over and around the top portion of latching member 21 to be held thereby in the fixed stowed position. FIG. 3 of the drawing also diagrammatically illustrates the use of a small shelf member 30 as being attached to the rear upper tubular member 3 such that there may be the holding of the front portion of the footrest plate member 9 while the latter is in the upper stowed position. On the other hand, when the assembly is being released from the stowed position by the action of the push-button means operating rod 24 and latch arm 23 such that the movable hook latch from member 21 drops down and away from the fixed pin 20 on the footrest assembly, then the latter would be pushed rearwardly a slight amount by virtue of the action of compression springs 18 in the front ends of the telescoping tube support members 8 and the forward edge of footrest plate 9 will pass down and around the edge of the support shelf 30 such that the entire footrest assembly may then be lowered in an arcuate manner to the floor level for use by the passenger to the rear, as illustrated in the dashed line positioning in FIG. 1. There is, of course, fore and aft adjustment as to the location of footrest plate member 9 by virtue of the telescoping tube arrangement between tubular members 8' and 8".

As best shown in FIG. 5, there is provided the use of a stiff tie rod member 31 between outer tube members 8' of the pair of telescoping tubes such that there is a connection and rigidity provided between the rearward portions of support tubes 8 in addition to the transverse connection provided by the footrest plate member 9 through bracket means 17 to the inner tube members 8". Where desired, additional transverse tube members, such as 31, may be used between the tube means 8' at the frontal end portions of the assembly as well as along intermediate portions thereof in order to provide a fairly rigid type of assembly. As best shown in FIG. 4 of the drawing, each of the side bracket means 17 from footrest plate member 9 is shown as having a curved lowered end portion 17' which wraps substantially completely around the rearward end portion of tubular means 8" and is connected thereto by pin or bolt means 32 such that there is a rigid connection between the footrest member 9 and the telescoping tubular members.

It is to be understood that there may be various modifications as to detail in the connection of the members to the framing as well as the connections between various portions of the footrest assembly. In addition, various equivalent latching arrangements may be provided in lieu of that illustrated. However, for purposes of readily stowing and releasing the footrest assembly from the upper stowed position of a seating unit, a desired form of latching arrangement will be such as to have at least one movable latching member which can be operated responsive to suitable push-button means in turn mounted such that a passenger to the rear of the seating unit can readily operate the entire assembly to effect its lowering, as well as its lifting and storing. For example, in lieu of a rotatable hook-form latching member, there may be utilized a spring biased movable pin as the latching member which would move under a shoulder means, or into a slot, associated with the support portion for the footrest member and the push-button means will be engageable with the pin member to push or pull it out of engagement with the footrest assembly so as to let such assembly be released from the stowed position.

With respect to seat support framing or structure, it is again to be noted that the present type of pull-down footrest assembly can be used with various types of seating units and support systems and there is no intent to limit its use to airplane seating nor to use with multiple seat support means such as with the illustrated embodiment having the transverse beam type of seat support structure.

I claim as my invention:

1. A stowable, pull-down footrest assembly that is adapted to be connected to and stowed under the seat framing of a vehicle seating unit, which comprises in combination:
   a. a pair of telescoping-tube footrest support members that are spaced apart laterally each of said members having their forward end portions pivotally connected to the upper front part of the framing below the seating level of said seating unit,
   b. a footrest plate member connecting across the rear portions of said telescoping tube support members, such that after said footrest plate member is lowered from a stowed position along with the tube support member there can be the extension of said telescoping tube members along and above the vehicle floor to reach a desired pulled-out, footrest location for the accommodation of a passenger seated in a next rearward seating unit,
   c. a movable latching member attached to the seat framing and a latch engagement member provided as a part of the rearward end portion of the footrest assembly that are in a connective association with one another such that said footrest assembly may be retained in a stowed location and alternatively released for use responsive to the movement of said latching member, and
   d. means remote from said latching member to move said latching member, said means being connected to the rear of said vehicle seating unit.

2. The footrest assembly of claim 1 further characterized in that there is a compression spring means provided in the end of the telescoping tube support members whereby there will be an initial slight extension between the two members when they are released from a locked position.

3. The footrest assembly of claim 1 further characterized in that spring biased latching means is provided to hold the rear portion of the footrest assembly in an upper stowed position and said latching means is releasable from engagement with said associated engagement member responsive to movement of a portion of the latching means, and said means to move said latching member will be push-button operated from the rear of said vehicle seating unit.

* * * * *